United States Patent
Ivans et al.

(10) Patent No.: US 10,259,560 B2
(45) Date of Patent: Apr. 16, 2019

(54) MODULAR PAYLOAD SYSTEMS FOR AIRCRAFT

(71) Applicant: Bell Helicopter Textron Inc., Fort Worth, TX (US)

(72) Inventors: Steven Ray Ivans, Fort Worth, TX (US); Brent Chadwick Ross, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 170 days.

(21) Appl. No.: 15/270,053

(22) Filed: Sep. 20, 2016

(65) Prior Publication Data

US 2018/0079482 A1    Mar. 22, 2018

(51) Int. Cl.
| | |
|---|---|
| *B64C 1/22* | (2006.01) |
| *B64D 1/02* | (2006.01) |
| *B64D 1/06* | (2006.01) |
| *B64C 1/00* | (2006.01) |
| *B64D 1/04* | (2006.01) |
| *B64D 7/00* | (2006.01) |
| *B64D 37/04* | (2006.01) |

(52) U.S. Cl.
CPC .................. *B64C 1/22* (2013.01); *B64C 1/00* (2013.01); *B64D 1/02* (2013.01); *B64D 1/04* (2013.01); *B64D 1/06* (2013.01); *B64C 2201/126* (2013.01); *B64C 2211/00* (2013.01); *B64D 7/00* (2013.01); *B64D 37/04* (2013.01)

(58) Field of Classification Search
CPC ................ B64C 1/22; B64C 2201/121; B64C 2201/128; B64C 7/00; B64D 1/10; B64D 1/04; B64D 1/06; B64D 1/08; B64D 7/00; B64D 37/04
See application file for complete search history.

(56) References Cited

U.S. PATENT DOCUMENTS

| 3,640,492 | A |   | 2/1972  | Star |                      |
|-----------|---|---|---------|------|----------------------|
| 3,947,080 | A | * | 3/1976  | Ege  | .......... H01R 31/00 |
|           |   |   |         |      | 439/249              |
| 4,697,764 | A | * | 10/1987 | Hardy | ........ B64D 1/06   |
|           |   |   |         |      | 244/137.4            |
| 4,736,910 | A | * | 4/1988  | O'Quinn | ...... B64C 1/0009 |
|           |   |   |         |      | 244/118.2            |
| 5,803,405 | A | * | 9/1998  | Ellis | .......... B64D 1/06 |
|           |   |   |         |      | 244/118.1            |
| 6,065,720 | A |   | 5/2000  | Ash et al. |               |

(Continued)

OTHER PUBLICATIONS

Jun. 30, 1998; "The challenges of aircraft hydraulic design" www.hydraulicspneumatics.com p. 4.*

(Continued)

*Primary Examiner* — Timothy D Collins
*Assistant Examiner* — Tye William Abell
(74) *Attorney, Agent, or Firm* — Lawrence Youst PLLC (57) ABSTRACT

A modular payload system for an aircraft includes a modular bay recessed within the aircraft. The modular bay includes a modular bay interface. The modular payload system includes a plurality of payload modules each having a respective function and a payload interface adapted to connect to at least a portion of the modular bay interface. The plurality of payload modules are interchangeably insertable into the modular bay to enable the modular bay to support the functions of the plurality of payload modules.

20 Claims, 11 Drawing Sheets

Fig.2

(56) References Cited

U.S. PATENT DOCUMENTS

| | | | | |
|---|---|---|---|---|
| 6,536,711 B1* | 3/2003 | Conway, Jr. | ............... | B64C 3/48 |
| | | | | 244/129.5 |
| 6,663,047 B1* | 12/2003 | Arata | ...................... | B64C 25/16 |
| | | | | 244/137.1 |
| 6,932,297 B1* | 8/2005 | Steindl | ................... | B64D 9/003 |
| | | | | 244/118.1 |
| 7,237,750 B2* | 7/2007 | Chiu | ....................... | A45C 13/02 |
| | | | | 244/119 |
| 8,292,220 B1* | 10/2012 | Westra | ................... | B64C 3/141 |
| | | | | 244/118.1 |
| 2005/0178912 A1* | 8/2005 | Whelan | ................ | B64C 1/0009 |
| | | | | 244/120 |
| 2005/0204910 A1* | 9/2005 | Padan | ..................... | B64D 1/04 |
| | | | | 89/1.813 |
| 2007/0034739 A1* | 2/2007 | Yoeli | .................... | B64C 1/1415 |
| | | | | 244/23 R |
| 2008/0054121 A1* | 3/2008 | Yoeli | .................... | B64C 1/1415 |
| | | | | 244/12.1 |
| 2009/0314894 A1* | 12/2009 | Frisch | ................... | B64C 1/1446 |
| | | | | 244/131 |
| 2010/0140406 A1* | 6/2010 | Walton | .................. | B64C 1/1415 |
| | | | | 244/129.5 |
| 2010/0258672 A1* | 10/2010 | Grabmeier | ............ | B64C 39/024 |
| | | | | 244/118.2 |
| 2015/0210392 A1* | 7/2015 | Hodge | ...................... | B64D 9/00 |
| | | | | 244/118.1 |
| 2015/0298807 A1* | 10/2015 | Chun | ........................ | B64C 7/00 |
| | | | | 244/137.4 |
| 2016/0229536 A1* | 8/2016 | Aull | ......................... | B64D 9/00 |
| 2016/0288906 A1* | 10/2016 | Christof | .................. | B64D 1/08 |
| 2017/0101181 A1* | 4/2017 | Mern | ....................... | B64D 1/06 |

OTHER PUBLICATIONS

European Exam Report; Application No. 17192070.5; EPO; dated Jan. 12, 2018.

European Search Report; Application No. 17192070.5; EPO; dated Nov. 16, 2017.

European Exam Report; Application No. 17192070.5; EPO; dated Aug. 9, 2018.

* cited by examiner

MODULAR PAYLOAD SYSTEMS FOR AIRCRAFT

TECHNICAL FIELD OF THE DISCLOSURE

The present disclosure relates, in general, to aircraft having a modular payload system and, in particular, to aircraft having one or more modular bays each adapted to receive a payload module selected from a group of two or more interchangeable payload modules such that each modular bay supports multiple functionality.

BACKGROUND

Some aircraft are equipped to carry multiple payload types. For example, a military aircraft may include a radar system for reconnaissance and one or more weapons systems, such as missiles, mounted thereon. In some cases, payloads are externally mounted on the aircraft, which increases the amount of drag experienced by the aircraft in flight. Typically, payload bays on conventional aircraft are built and intended for a single type of payload, and therefore do not support multipurpose use. For example, a weapons bay on the underside of an aircraft is unable to contain non-weapon payload types, such as a radar system, and may even be unable to contain weapons other than the specific type of weapon for which the bay was intended. Accordingly, a need has arisen for an improved payload system operable to receive mission dependent payloads and produce minimal drag during aircraft flight.

SUMMARY

In a first aspect, the present disclosure is directed to a modular payload system for an aircraft including a modular bay recessed within the aircraft. The modular bay includes a modular bay interface. The modular payload system includes a plurality of payload modules each having a respective function and a payload interface adapted to connect to at least a portion of the modular bay interface. The plurality of payload modules are interchangeably insertable into the modular bay to enable the modular bay to support the functions of the plurality of payload modules.

In some embodiments, the payload interface may be adapted to connect to at least a portion of the modular bay interface to provide of electrical communication, hydraulic communication, data communication and/or fluid communication between the aircraft and the respective payload module. In certain embodiments, the modular bay interface may include a power connector, a ground connector, an imagery connector, a data bus connector, a cooling connector and/or a fuel line connector. In some embodiments, the modular bay may be located on the underside of the fuselage of the aircraft. In certain embodiments, the payload interface may be positioned on each of the plurality of payload modules such that the payload interface is adjacent the modular bay interface when one of the plurality of payload modules is inserted in the modular bay. In certain embodiments, the payload interface of a payload module may connect to at least a portion of the modular bay interface in response to the payload module being inserted into the modular bay.

In some embodiments, the modular bay interface may include a plurality of connectors and the payload interface for each payload module may include one or more payload connectors such that the payload connectors may be connected to at least a portion of the connectors of the modular bay interface. In some embodiments, the payload modules may be selected from the group consisting of a weapon module, a communications module, an air reconnaissance module, an anti-surface warfare module, an anti-submarine warfare module, an electronics warfare module and a signals intelligence module. In certain embodiments, the plurality of payload modules may include a payload module having a bay door. In such embodiments, the payload module may form an interior cavity adapted to carry a payload and the bay door may be adapted to open in response to a command from the aircraft to expose the payload. Also, in such embodiments, the payload may include one or more missiles operably mounted to the bay door.

In some embodiments, the modular bay may include at least one wall having the modular bay interface. In such embodiments, the modular bay interface may include a plurality of connectors that may be either protruding or substantially flush with the wall. In certain embodiments, the modular bay may include one or more tracks adapted to guide the payload modules into the modular bay. In such embodiments, the plurality of payload modules may each include one or more grooves adapted to slidably engage with the tracks. In some embodiments, the modular bay interface and the payload interface may include a quick disconnect junction. In such embodiments, the quick disconnect junction may include a bay receptacle in the modular bay and a payload module receptacle on each payload module wherein the bay receptacle may be adapted to connect to the payload module receptacle in response to one of the payload modules being inserted into the modular bay.

In a second aspect, the present disclosure is directed to an aircraft including a fuselage and a modular bay recessed within the underside of the fuselage. The modular bay includes a modular bay interface. The aircraft includes one of a plurality of payload modules inserted into the modular bay. The plurality of payload modules each has a respective function and a payload interface adapted to connect to at least a portion of the modular bay interface. The payload modules are interchangeably insertable into the modular bay to enable the modular bay to support the functions of the plurality of payload modules.

In some embodiments, the aircraft may also include a second modular bay recessed within the underside of the fuselage. The second modular bay may include a modular bay interface. In such embodiments, the aircraft may include one of a second plurality of payload modules inserted into the second modular bay. The second plurality of payload modules each may have a respective function and a payload interface adapted to connect to at least a portion of the modular bay interface of the second modular bay. The second plurality of payload modules may be interchangeably insertable into the second modular bay to enable the second modular bay to support the functions of the second plurality of payload modules. In some embodiments, the modular bay may be a central modular bay and the second modular bay may flank the central modular bay. In certain embodiments, the modular bay and the plurality of payload modules may be sized differently than the second modular bay and the second plurality of payload modules.

BRIEF DESCRIPTION OF THE DRAWINGS

For a more complete understanding of the features and advantages of the present disclosure, reference is now made to the detailed description along with the accompanying schematic figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction.

Figure 1A:
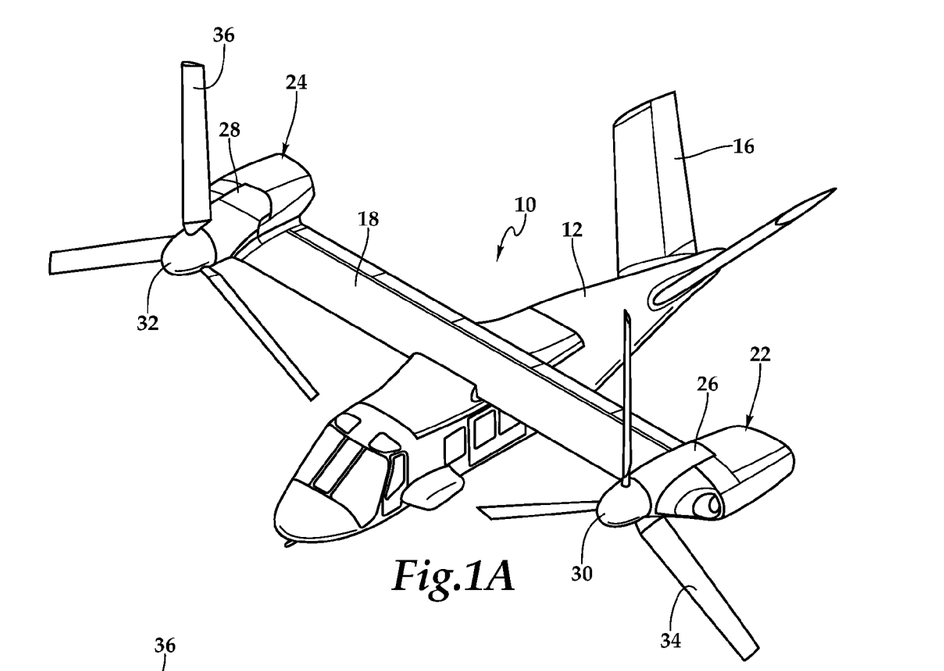
FIGS. 1A-1C are schematic illustrations of a tiltrotor aircraft having a modular bay in accordance with embodiments of the present disclosure.
Figure 1B:
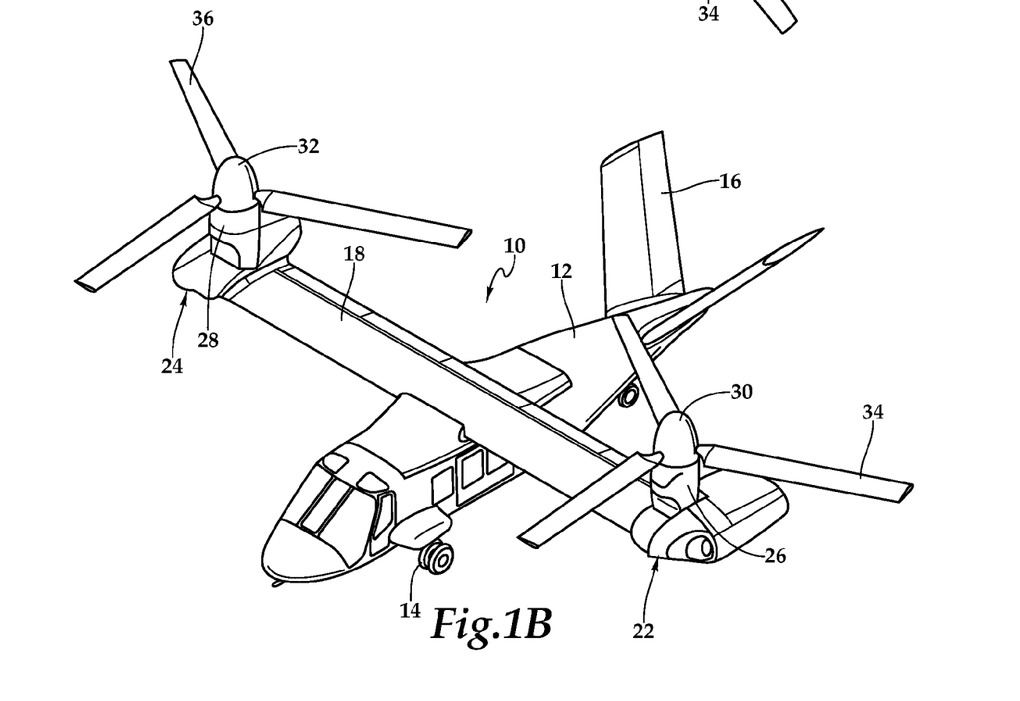
Figure 1C:
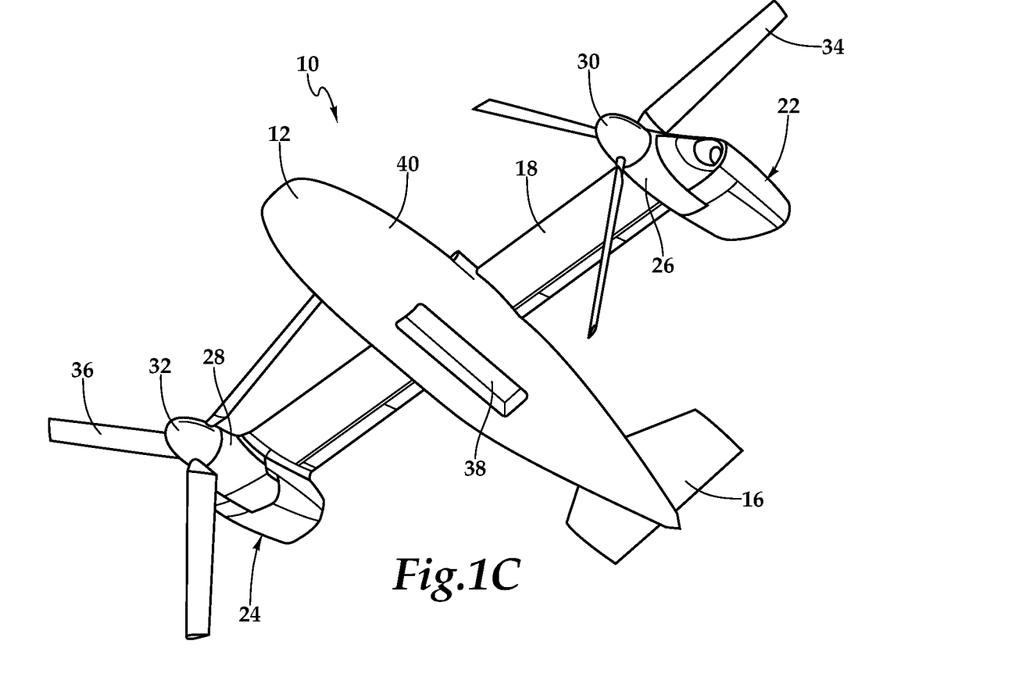
Figure 2:
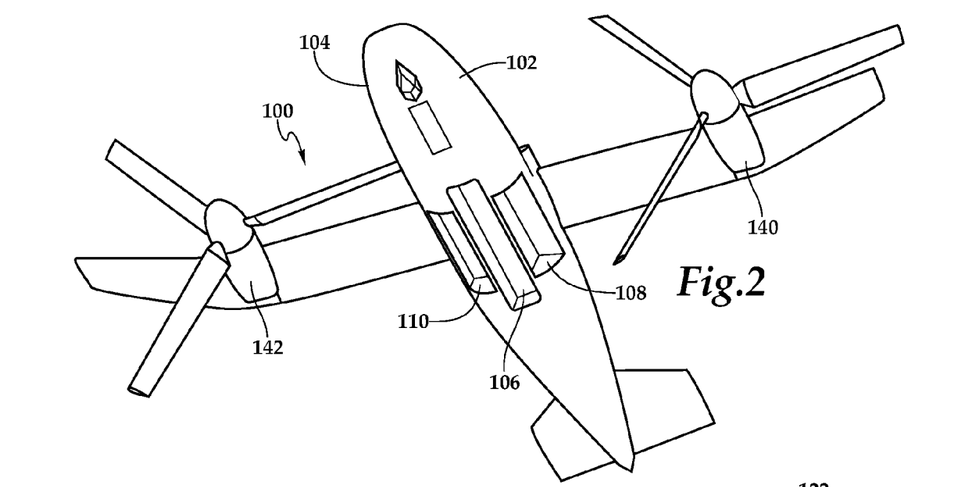
FIG. 2 is an isometric view of an unmanned aerial vehicle having modular bays in accordance with embodiments of the present disclosure.

Referring to FIGS. 1A-1C in the drawings, a tiltrotor aircraft is schematically illustrated and generally designated 10. Tiltrotor aircraft 10 includes a fuselage 12, landing gear 14, tail member 16, wing 18 and pylon assemblies 22, 24. Wing 18 is supported by fuselage 12. Pylon assemblies 22, 24 are positioned, respectively, proximate the outboard ends of wing 18. Rotatably mounted on pylon assemblies 22, 24 are rotor assemblies 26, 28, which respectively include proprotors 30, 32. In some embodiments, pylon assemblies 22, 24 may each include a nacelle having an engine, transmission and/or gearbox to provide torque and rotational energy to proprotors 30, 32. Proprotors 30, 32 each include a plurality of proprotor blade assemblies 34, 36, respectively. The position of rotor assemblies 26, 28 and the pitch of proprotor blade assemblies 34, 36 are determined using a flight control system to selectively control the direction, thrust and lift of tiltrotor aircraft 10. FIGS. 1A and 1C illustrate tiltrotor aircraft 10 in airplane, or forward flight, mode, in which proprotors 30, 32 are positioned to rotate in a substantially vertical plane to provide a forward thrust while a lifting force is supplied by wing 18 such that tiltrotor aircraft 10 flies much like a conventional propeller driven aircraft. FIG. 1B illustrates tiltrotor aircraft 10 in helicopter, or vertical takeoff and landing (VTOL) flight, mode, in which proprotors 30, 32 are positioned to rotate in a substantially horizontal plane to provide a lifting thrust such that tiltrotor aircraft 10 flies much like a conventional helicopter. Tiltrotor aircraft 10 can also be operated such that proprotors 30, 32 are selectively positioned between airplane mode and helicopter mode, which can be referred to as conversion flight mode.

Referring specifically to FIG. 1C, a modular bay 38 is recessed, fully or partially, on an underside 40 of fuselage 12. Modular bay 38 is adapted to receive one of a plurality of payload modules that each have a respective or different function. The various payload modules of the illustrative embodiments are interchangeably insertable into modular bay 38, thereby enabling modular bay 38 to support or contain any of the functions of the payload modules and providing a high degree of operational adaptability for tiltrotor aircraft 10. By recessing modular bay 38, a payload module may be fully or partially "internalized" within fuselage 12, thereby avoiding a drag penalty during flight and improving the cruise efficiency and endurance of tiltrotor aircraft 10. Avoiding such a drag penalty may be especially important in unmanned aerial vehicle missions in which endurance is a priority.

While the illustrated embodiment shows a single modular bay, tiltrotor aircraft 10 made include any number of modular bays, which may be uniform or non-uniform in size, shape or other characteristics. Although modular bay 38 has been illustrated in the context of tiltrotor aircraft 10, it will be understood by those of ordinary skill in the art that modular bay 38 can be implemented in a variety of ways on a variety of aircraft, including aircraft that can benefit from conveniently interchangeable payloads. Modular bay 38 may be implemented on tiltwing aircraft, quad tiltrotor aircraft, unmanned aircraft, airplanes, helicopters and the like. As such, those skilled in the art will recognize that modular bay 38 can be integrated into a variety of aircraft configurations.

Referring to FIGS. 2 and 3A-3G, an unmanned aerial vehicle having a modular payload system is schematically illustrated and generally designated 100. Underside 102 of fuselage 104 includes a central modular bay 106 and side modular bays 108, 110. In the illustrated embodiment, side modular bays 108, 110 flank central modular bay 106. Central modular bay 106 and side modular bays 108, 110 are also abreast relative to one another. Central modular bay 106 is sized differently than side modular bays 108, 110, allowing the modular bays to accept different sized payload modules. In one non-limiting example, side modular bays 108, 110 may be used for sensors and air-to-ground weapons payloads, and central modular bay 106, which is long, slender and located along a centerline of unmanned aerial vehicle 100, may be used for oversized payloads such as torpedoes and air-to-air weapons, thereby increasing the mission capabilities beyond what is usually available in other unmanned aerial vehicles of similar size.

Figure 3A:
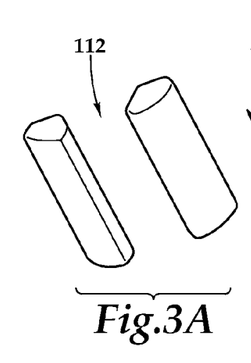
FIGS. 3A-3G are isometric views of various payload modules having different functions in accordance with embodiments of the present disclosure.
Figures 3B, 3C:
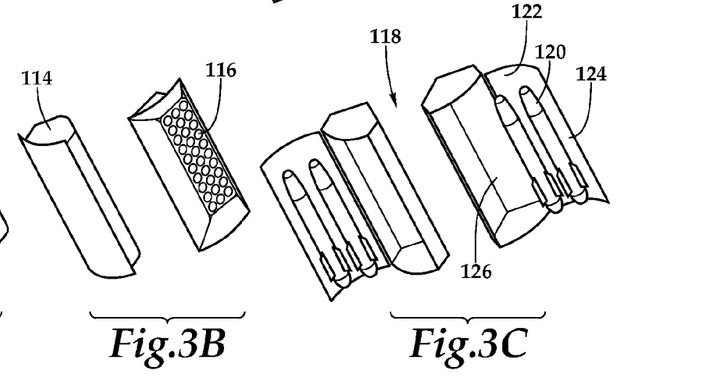

FIGS. 3A-3C show various payload modules, having different respective functions, which are interchangeably insertable into side modular bays 108, 110. Side modular bays 108, 110 are sized to receive the payload modules shown in FIGS. 3A-3C. FIG. 3A illustrates fuel modules 112, which are capable of carrying fuel tanks or bags to be used by unmanned aerial vehicle 100. FIG. 3B illustrates a light detection and ranging (LIDAR) module 114 and a sonobuoy launcher module 116. The sonobuoy launcher module 116 may be any size, such as a 30 "G" size. LIDAR module 114 and sonobuoy launcher module 116 are air reconnaissance and anti-submarine warfare modules, respectively, that allow unmanned aerial vehicle 100 to perform reconnaissance operations. FIG. 3C illustrates weapons modules 118 that include missiles 120 mounted on an inner surface 122 of a bay door 124. Weapons modules 118 form an interior cavity 126 adapted to carry, or contain, missiles 120 when bay door 124 is closed. Bay door 124 is adapted to open in response to a command from unmanned aerial vehicle 100, or from elsewhere, to expose missiles 120. Weapons modules 118 may each include actuation to open and close bay door 124. In one non-limiting example, each of the weapons modules 118 includes a weapons mount on inner surface 122, associated electrical power and control for missiles 120 and bay door 124 as well as an actuator for bay doors 124. Non-limiting examples of missiles 120 are air-to-ground missiles such as Hellfire or JAGM missiles.

Figure 3D:
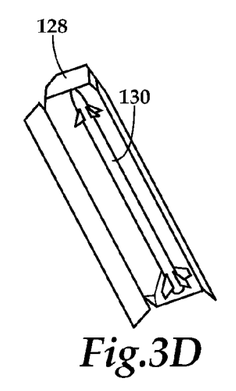
Figure 3E:
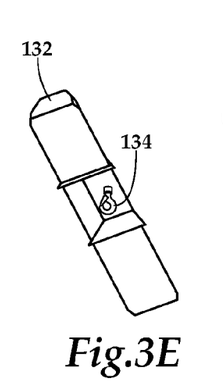
Figure 3F:
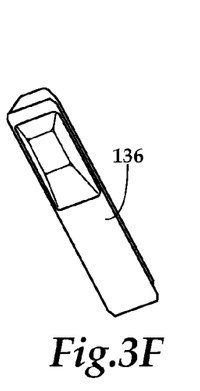
Figure 3G:
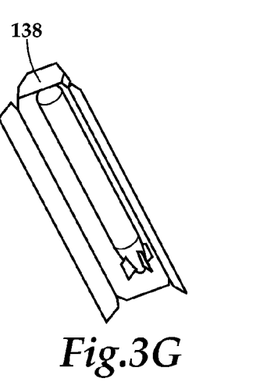

FIGS. 3D-3G show various payload modules, having different respective functions, which are interchangeably insertable into central modular bay 106. Central modular bay 106 is sized to receive any of the payload modules shown in FIGS. 3D-3G. FIG. 3D shows a weapons module 128 that includes a short range air-to-air missile 130, such as an AIM-9 Sidewinder missile. Weapons module 128 has two bay doors, each of which may function analogously to bay door 124 in FIG. 3C. FIG. 3E illustrates a combination module 132 that includes a cargo hook 134 as well as a deck lock and 600 pounds of fuel. Combination modules, such as combination module 132, allow more than one function to be integrated into a single payload module. FIG. 3F shows a reconnaissance module 136, such as a 360 degree surface radar or multispectral sensor. FIG. 3G illustrates an anti-submarine warfare module 138. In the illustrated embodiment, anti-submarine warfare module 138 includes an MK50 torpedo.

The wide range of functions of the payload modules shown in FIGS. 3A-3G are exemplary of the wide array of functions that are supported by the modular payload system of unmanned aerial vehicle 100. The payload modules shown in FIGS. 3A-3C are interchangeable in modular bays 108, 110 and the payload modules shown in FIGS. 3D-3G are interchangeable in modular bay 106, thus allowing unmanned aerial vehicle 100 to perform the various functions of the payload modules and implement a wide range of operational missions by simply interchanging payload modules in modular bays 106, 108, 110. In contrast to current aircraft, in which a bay or mount is purpose-built for a single type of payload, the payloads of unmanned aerial vehicle 100 may be customized to each mission. Also, by receiving the various payload modules on underside 102 of fuselage 104, which are underneath the wings and rotors of unmanned aerial vehicle 100, center of gravity balance issues may be avoided, which can be especially important on tiltrotor aircraft, such as unmanned aerial vehicle 100, due to the ability to move pylons 140, 142 between helicopter and airplane modes.

Figure 4:
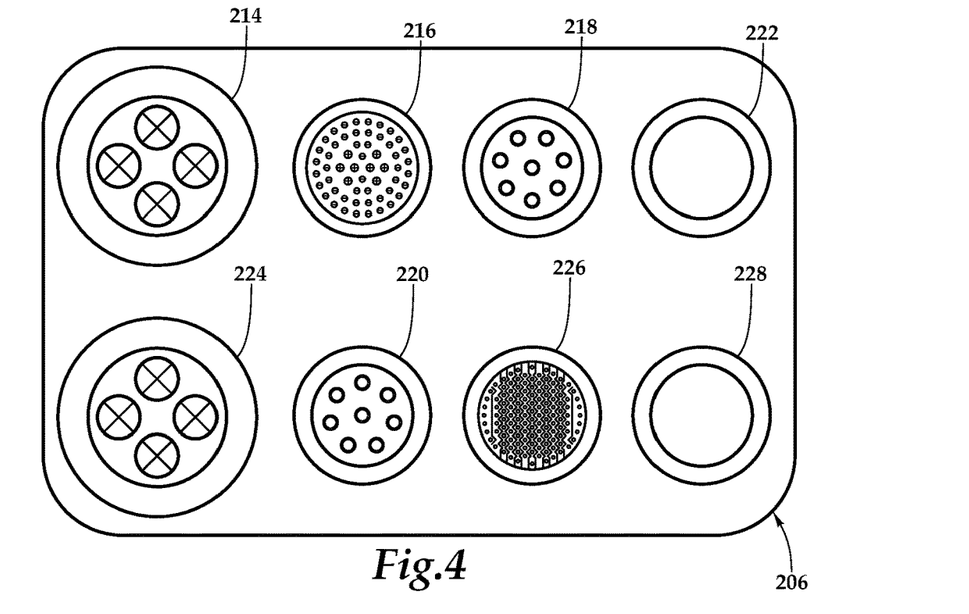
FIG. 4 is a front view of a modular bay interface in accordance with embodiments of the present disclosure.

Referring to FIGS. 4, 5A-5D and 6, a modular payload system is schematically illustrated and generally designated 200. One or more walls 204 within unmanned aerial vehicle 200 define central modular bay 202. One of the walls 204 may include modular bay interface 206. Modular bay interface 206 may include one or more connectors to enable communication with payload modules 208, 210, 212 shown in FIGS. 5B-5D. Referring specifically to FIG. 4, modular bay interface 206 includes two different types of power connectors 214, 216, two different types of imagery connectors 218, 220, fuel line connector 222, ground connector 224, data bus connector 226 and cooling connector 228. Cooling provisions, if required, may also be integrated into a bay door of a payload module, which may be changed with the payload. Data bus connector 226, or other connections on modular bay interface 206, may include pin connections. Data bus connector 226 may include control capabilities to allow control of a payload module. Such a control connection may also be separate from data bus connector 226. Connectors 214, 216, 218, 220, 222, 224, 226, 228 are substantially flush, or integrated, with wall 204 on which modular bay interface 206 is located.

Figures 5A, 5B, 5C, 5D:
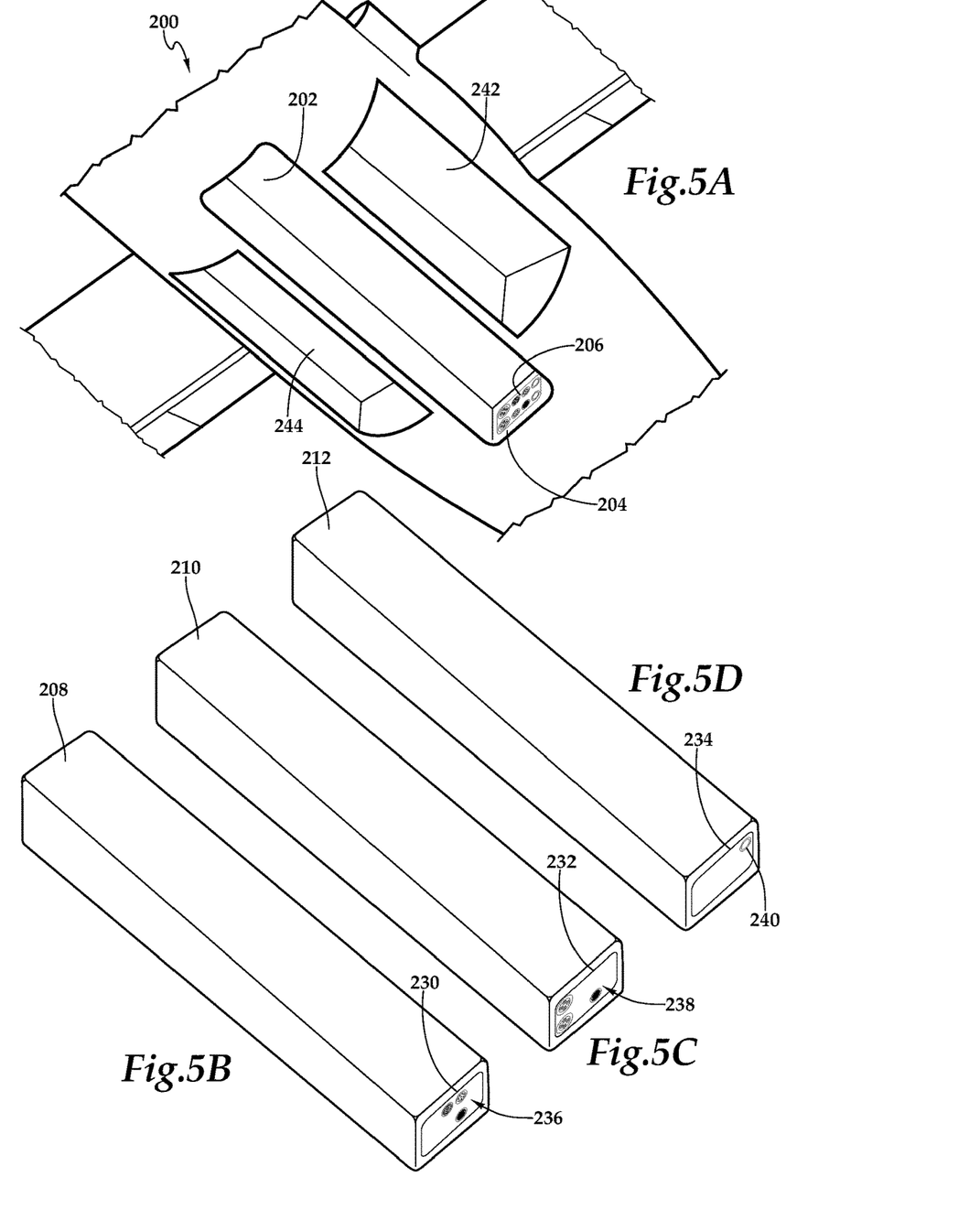
FIGS. 5A-5D are isometric views of modular bays and interchangeable payload modules in accordance with embodiments of the present disclosure.

Payload modules 208, 210, 212, which are interchangeably insertable into central modular bay 202, have respective payload interfaces 230, 232, 234. Payload interfaces 230, 232, 234 are adapted to connect to at least a portion of connectors 214, 216, 218, 220, 222, 224, 226, 228 of modular bay interface 206 to provide electrical, hydraulic, data, fluid or other communication between central modular bay 202 and the inserted payload module. Payload modules 208, 210, 212 have different functions, and thus have different payload connectors on their respective payload interfaces 230, 232, 234. Payload modules 208, 210, 212 need not utilize all of connectors 214, 216, 218, 220, 222, 224, 226, 228 of modular bay interface 206. Specifically, payload module 208 in FIG. 5B is an air reconnaissance module, such as a radar, that includes data, power and imagery payload connectors 236 that are connectable, or matable, with power connector 216, imagery connector 218 and data bus connector 226 of modular bay interface 206. Payload module 210 of FIG. 5C is a weapons module, such as a missile bay, that includes payload connectors 238 that connect to power connector 214, ground connector 224 and data bus connector 226 of modular bay interface 206 to enable the functions of the weapons therein. Payload module 212 in FIG. 5D is a fuel module that includes a payload connector 240 that connects to fuel line connector 222 of modular bay interface 206 to establish fluid communication between payload module 212 and central modular bay 202. In some embodiments, payload connector 240 and fuel line connector 222 may be a quick disconnect connection. Payload module 212 may also include a fuel pump in some embodiments, in which case payload interface 234 may include a power payload connector to provide power to the fuel pump.

Payload interfaces 230, 232, 234 are positioned on payload modules 208, 210, 212 such that payload interfaces 230, 232, 234 are adjacent modular bay interface 206 when one of payload modules 208, 210, 212 is inserted in modular bay 206. In some embodiments, payload connectors 236, 238, 240 connect to the complementary portion of connectors 214, 216, 218, 220, 222, 224, 226, 228 in response to one of payload modules 208, 210, 212 being inserted into central modular bay 202. In other embodiments, the connections between payload connectors 236, 238, 240 and the complementary portion of connectors 214, 216, 218, 220, 222, 224, 226, 228 may be performed manually by a person. Because modular bay interface 206 is able to connect to a wide variety of payload modules, such as payload modules 208, 210, 212, central modular bay 202 is able to support any function performable by a payload module, thus providing an aircraft with a wide range of adaptability to the particular mission or operational circumstances. It will be appreciated by one of ordinary skill in the art that central modular bay 202 may have more than one modular bay interface, and payload modules 208, 210, 212 may each have more than one payload interface. Side modular bays 242, 244 may also each include a modular bay interface (not shown) analogous to modular bay interface 206, and the payload modules insertable within side modular bays 242, 244 may include matable payload interfaces.

Figure 6:
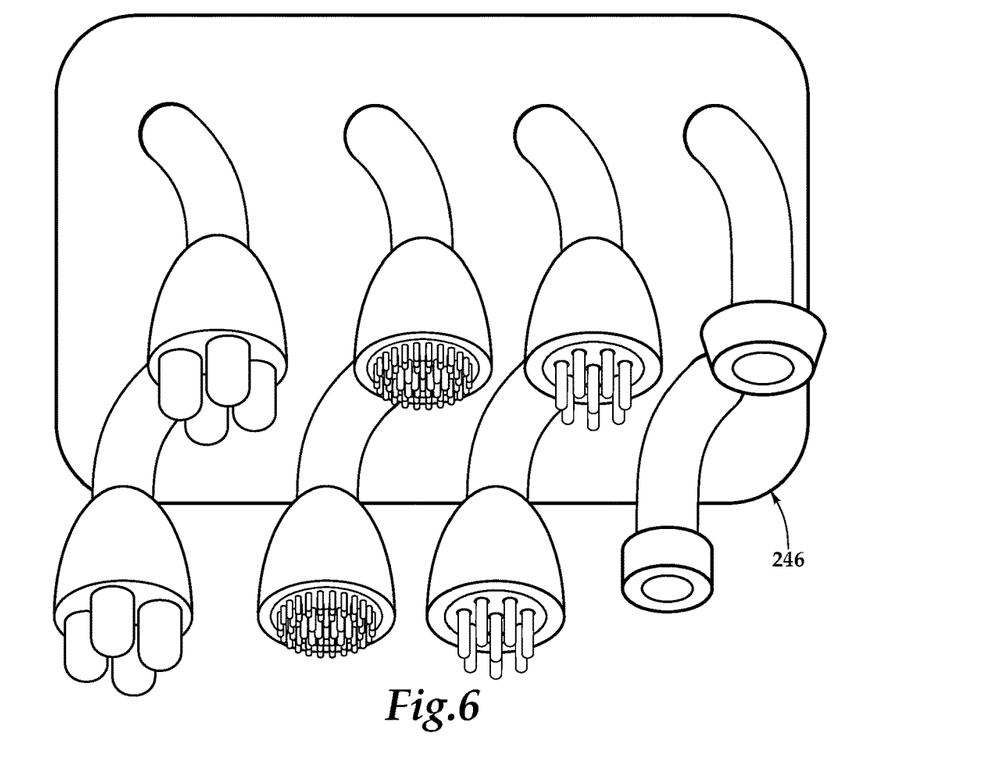
FIG. 6 is a front view of a modular bay interface in accordance with embodiments of the present disclosure.
Figure 7A:
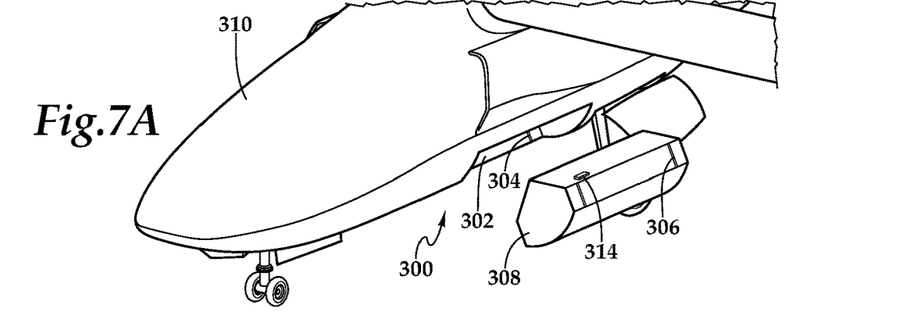
FIGS. 7A-7D are isometric views of an unmanned aerial vehicle with a modular bay in which a payload module is being inserted in accordance with embodiments of the present disclosure.
Figure 7B:
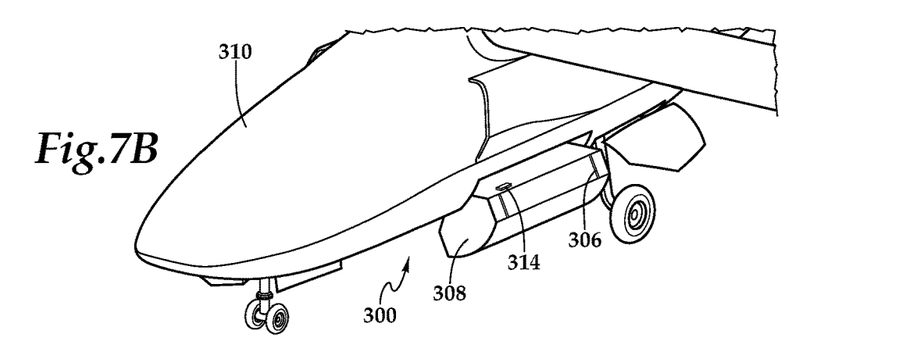
Figure 7C:
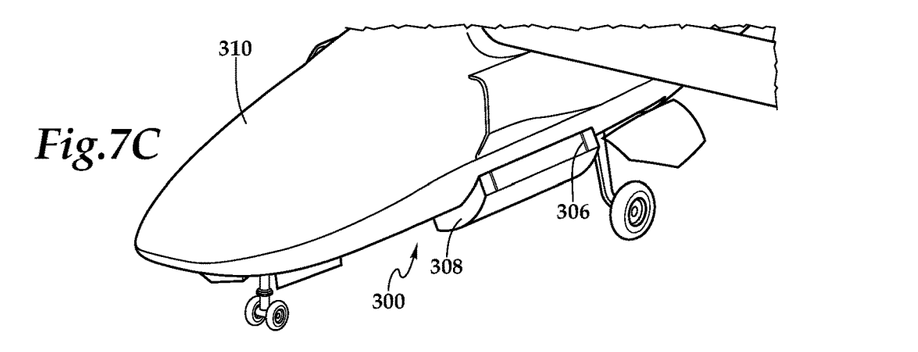
Figure 7D:
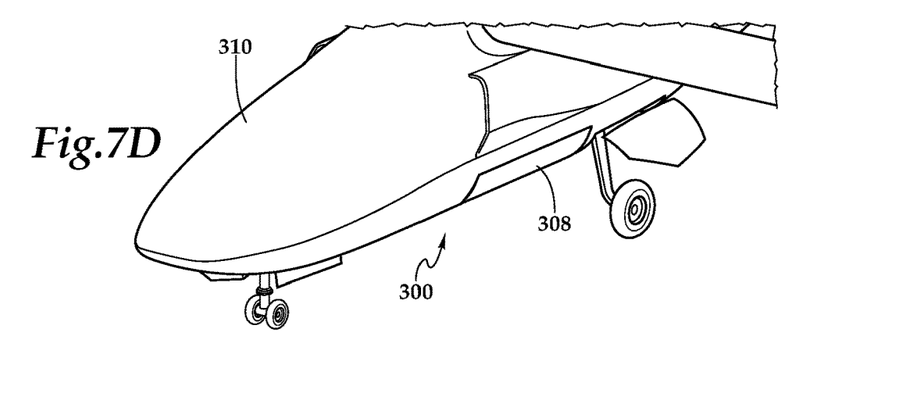
Figure 8A:
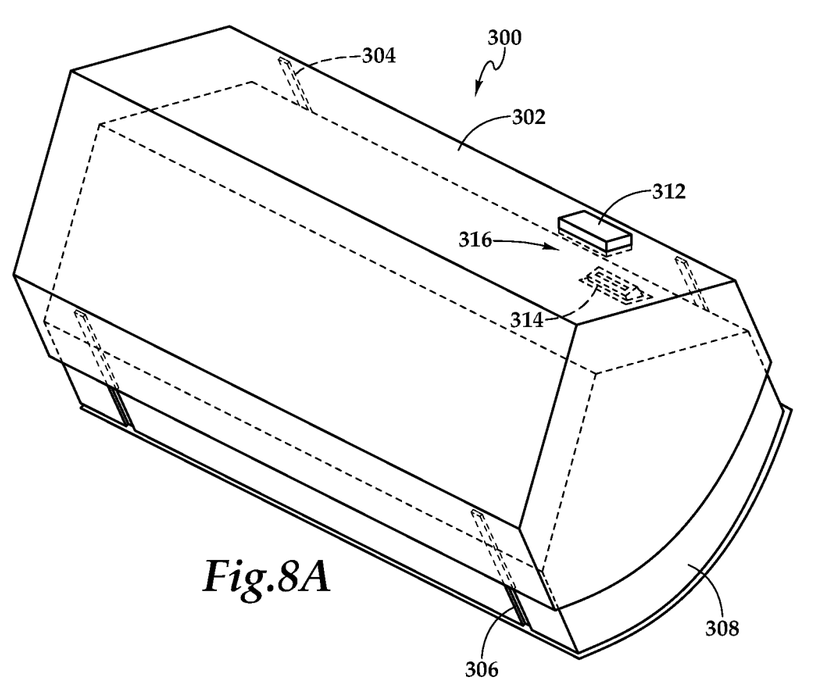
FIGS. 8A-8B are isometric views of a payload module being inserted into a modular bay in accordance with embodiments of the present disclosure.
Figure 8B:
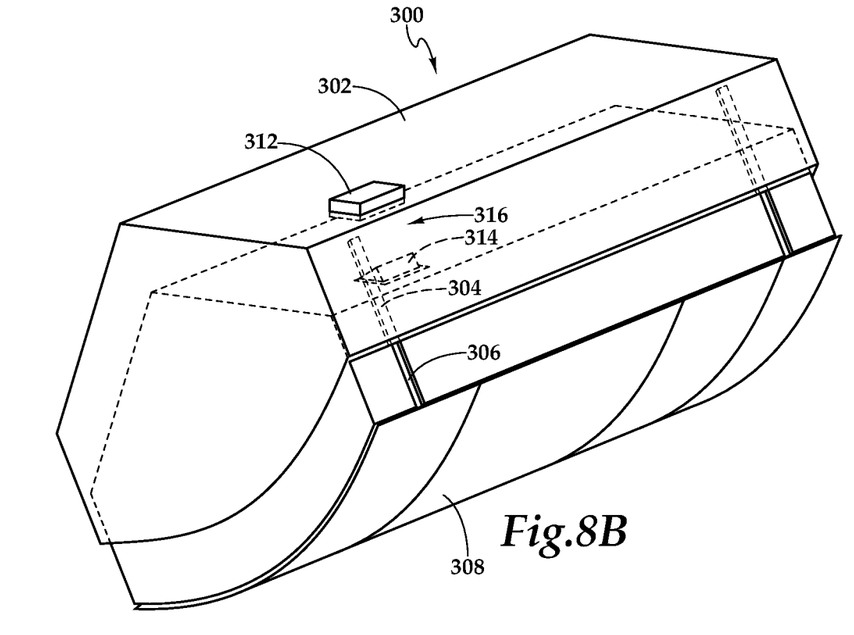
Figures 9A, 9B:
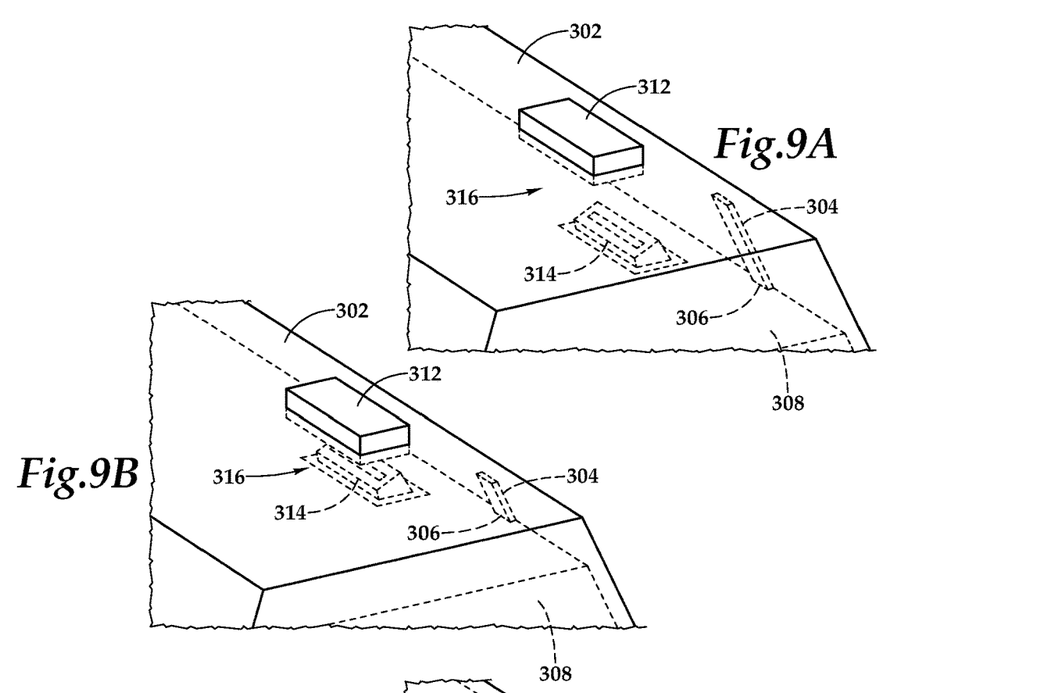
FIGS. 9A-9D are isometric views of a quick disconnect junction in accordance with embodiments of the present disclosure.
Figures 9C, 9D:
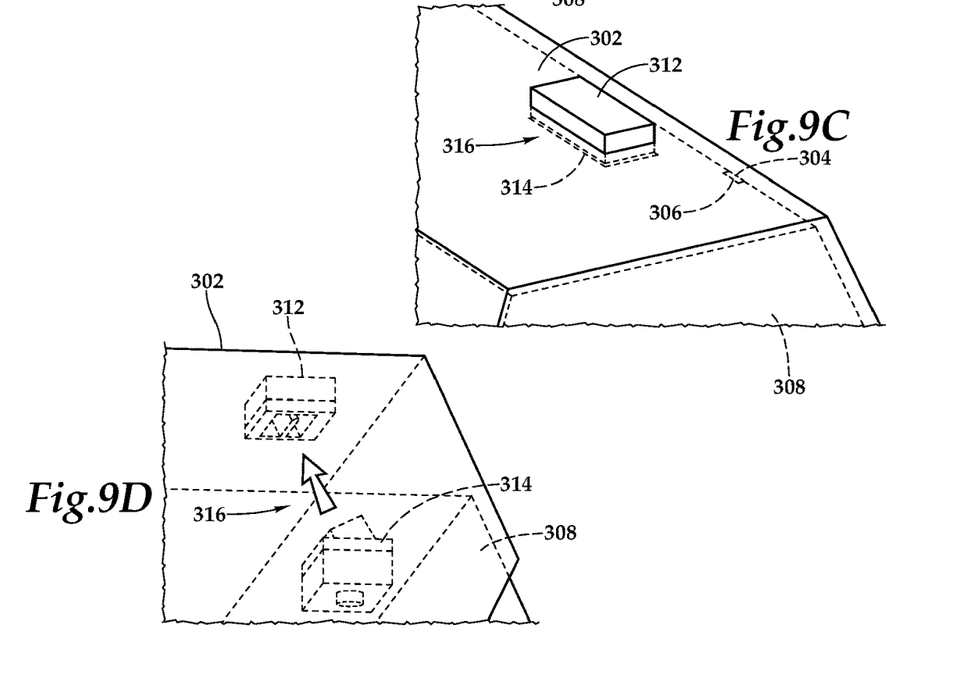

Referring specifically to FIG. 6, modular bay interface 246 includes connectors that are similar to connectors 214, 216, 218, 220, 222, 224, 226, 228 of modular bay interface 206, except that the connectors on modular bay interface 246 protrude from wall 204 on which modular bay interface 246 is mounted. Such "pigtail" connectors may, in some embodiments, be extendable and retractable relative to wall 204. The pigtail connectors on modular bay interface 246 may be used to lengthen the reach of the connectors to better enable a connection with a payload module inserted in central modular bay 202. It will be appreciated by one of ordinary skill in the art that the connectors on modular bay interfaces 206, 246 may be male connectors, female connectors or a combination thereof, and payload connectors 236, 238, 240 may be complementary to the connectors on modular bay interfaces 206, 246 to allow a matable connection.

Referring to FIGS. 7A-7D, 8A-8B, 9A-9D and 10, a modular payload system is schematically illustrated and generally designated 300. Modular bay 302 includes tracks 304 that slidably engage with grooves 306 on payload module 308 to guide payload module 308 into modular bay 302. Tracks 304 and grooves 306 allow payload module 308 to be easily removed and installed in modular bay 302. Tracks 304 and grooves 306 also help to ensure that payload module 308 is properly inserted into modular bay 302, as illustrated in the progression of FIGS. 7A-7D. While modular payload system 300 is illustrated as having four tracks 304 and four grooves 306, modular payload system 300 may have any number of tracks and grooves. Furthermore, tracks 304 may be located on payload module 308 and grooves 306 may be located on modular bay 302. One of ordinary skill in the art will appreciate that other slidably engageable components, such as pairs of sliders with bearings therebetween, may be utilized to guide payload module 308 into modular bay 302. Payload module 308 may be locked into position with pins, brackets or other devices to ensure retention once payload module 308 has been fully inserted into modular bay 302.

As best seen in FIGS. 8A-8B and 9A-9D, the modular bay interface of modular bay 302 is a bay receptacle 312 and the payload interface of payload module 308 is a payload module receptacle 314 which together form a quick disconnect junction 316. Quick disconnect junction 316 may allow for electrical, hydraulic, data, fluid or other communication between unmanned aerial vehicle 310 and payload module 308. In the illustrated embodiment, quick disconnect junction 316 provides electrical communication between unmanned aerial vehicle 310 and payload module 308. Quick disconnect junction 316 allows for an easily connectable and disconnectable communication link between modular bay 302 and payload module 308. Tracks 304 and grooves 306 guide payload module 308 into modular bay 302 in such a way that bay receptacle 312 and payload module receptacle 314 connect and form a communication link in response to payload module 308 being inserted into modular bay 302. While bay receptacle 312 is located on a top wall of modular bay 302 and payload module receptacle 314 is correspondingly located on a top surface of payload module 308, bay receptacle 312 and payload module receptacle 314 may be located anywhere on modular bay 302 and payload module 308, respectively, that allows bay receptacle 312 and payload module receptacle 314 to engage in response to payload module 308 being pushed into or inserted into modular bay 302. In some embodiments, quick disconnect junction 316 may utilize pins to enable electrical or data communication, analogous to a docking station for a portable data processing system, such as a laptop computer.

Figure 10:
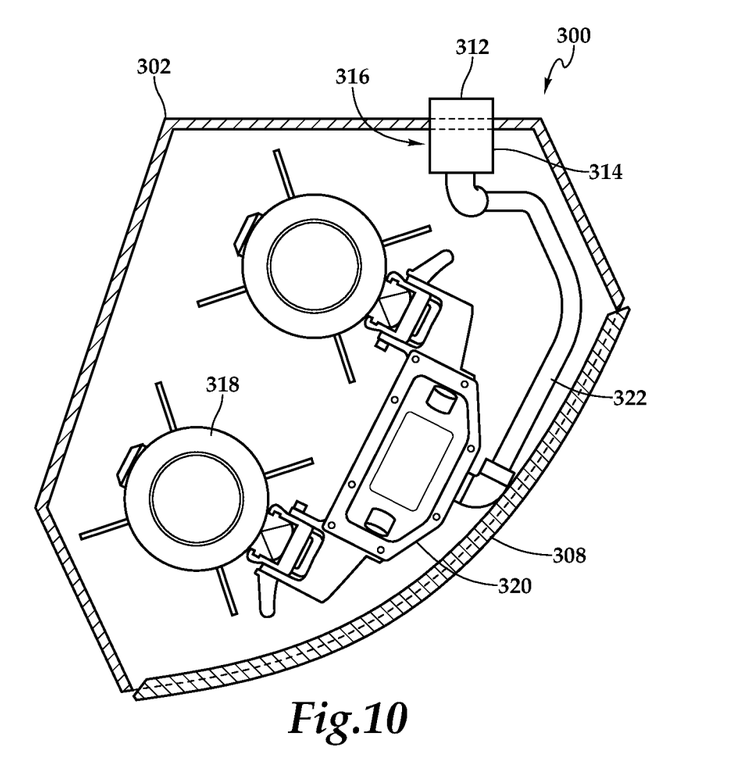
FIG. 10 is a cross-sectional view of a payload module inserted into a modular bay in accordance with embodiments of the present disclosure.

Referring specifically to FIG. 10, payload module 308 includes missiles 318 mounted within payload module 308 by a missile launcher support 320. Missiles 318 require power to launch properly. Such power is supplied by electrical connection 322 that provides electrical communication between payload module receptacle 314 and missiles 318 via missile launcher support 320. Thus, when payload module 308 is fully inserted into modular bay 302, thereby engaging quick disconnect junction 316, electrical communication is provided from unmanned aerial vehicle 310 to missiles 318. It will be appreciated by one of ordinary skill in the art that tracks 304, grooves 306 and quick disconnect junction 316 may be used on modular bays of any size, shape or orientation, such as central modular bay 202 in FIG. 5A.

Figure 11A:
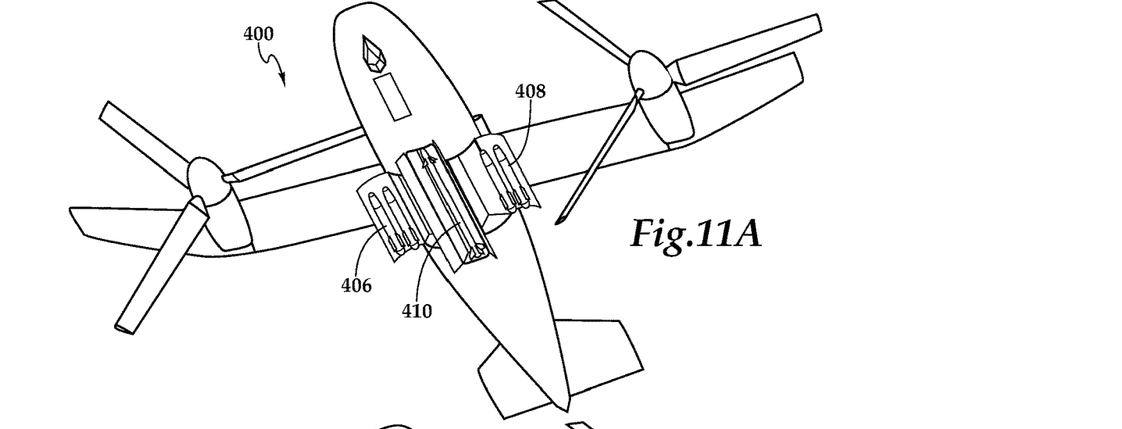
FIG. 11A-11C are isometric views of an unmanned aerial vehicle having various combinations of payload modules inserted therein in accordance with embodiments of the present disclosure.
Figure 11B:
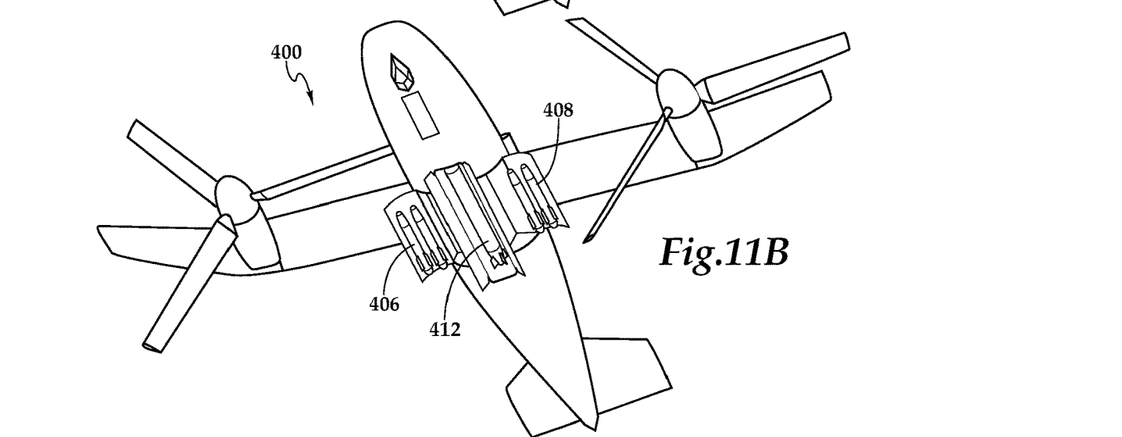
Figure 11C:
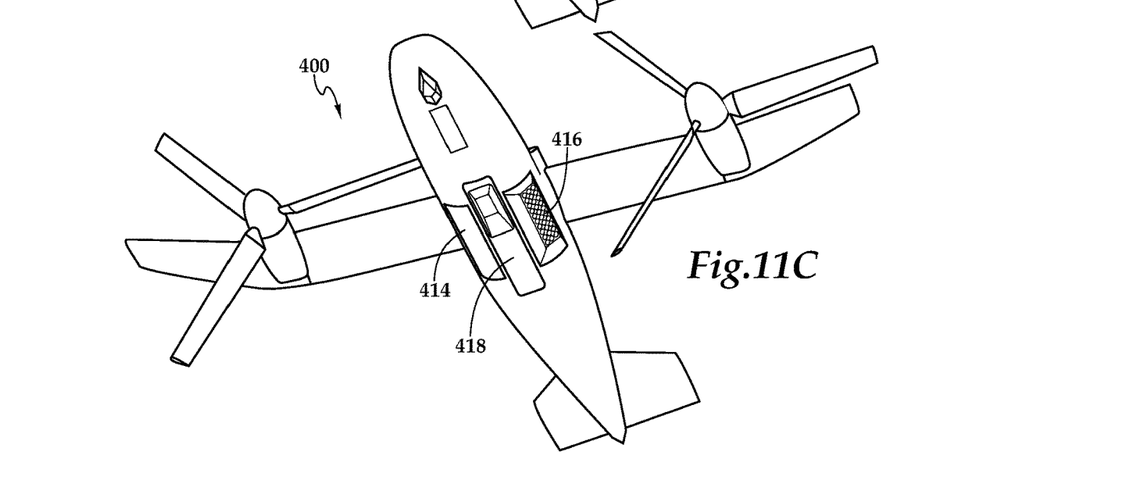

Referring to FIGS. 11A-11C in the drawings, an unmanned aerial vehicle having different payload configurations is schematically illustrated and generally designated 400. The three payload configurations of unmanned aerial vehicle 400 illustrate that the modular payload system of the illustrative embodiments allow a single aircraft to quickly and easily adapt to a particular mission simply by interchanging the payload modules inserted in the aircraft's modular bays. A single aircraft may change its purpose and operational capabilities from mission to mission by changing the payload modules inserted therein. For example, unmanned aerial vehicle 400 in FIG. 11A, which utilizes missiles for an enemy attack mission, may be quickly and easily changed into the surveillance aircraft in FIG. 11C, in which unmanned aerial vehicle 400 utilizes a variety of sensors. The modular payload system on unmanned aerial vehicle 400 eliminates the need for multiple aircraft to perform multiple mission types. For example, on an aircraft carrier, instead of storing different types of aircraft, each for a respective mission type, a single aircraft using the modular payload system of the illustrative embodiments may use interchangeable payload modules to perform different missions, thereby conserving space on the aircraft carrier. Payload modules may also be shared and interchanged among multiple aircraft that utilize the modular payload system.

FIGS. 11A-11C show different combinations of payload modules on unmanned aerial vehicle 400. In FIG. 11A, unmanned aerial vehicle 400 is adapted for air-to-air and air-to-surface attack. Specifically, unmanned aerial vehicle 400 includes Hellfire missiles 406, 408 for air-to-surface attack capability, and Sidewinder missile 410 for short range air-to-air attack capabilities. Unmanned aerial vehicle 400 in FIG. 11B is adapted for air-to-surface and anti-submarine attack, and includes Hellfire missiles 406, 408 and torpedo 412. Unmanned aerial vehicle 400 in FIG. 11C is adapted for surveillance missions, and includes LIDAR module 414, sonobuoy launcher 416 and radar 418. In yet other configurations, unmanned aerial vehicle 400 may include a deck lock system and cargo hook in a central modular bay and an automatic landing system in a side modular bay. Unmanned aerial vehicle 400 may also be equipped solely for anti-submarine operations, in which case unmanned aerial vehicle 400 may include a dipping sonar, a sonobuoy launcher and torpedoes in respective modular bays. In yet another combination of payload modules, unmanned aerial vehicle 400 may be equipped for anti-ship warfare and include Hellfire missiles, radar and an IR targeting sensor in respective modular bays. Indeed, the combinations of payload modules that may be utilized by unmanned aerial vehicle 400 are varied and numerous.

Figure 12:
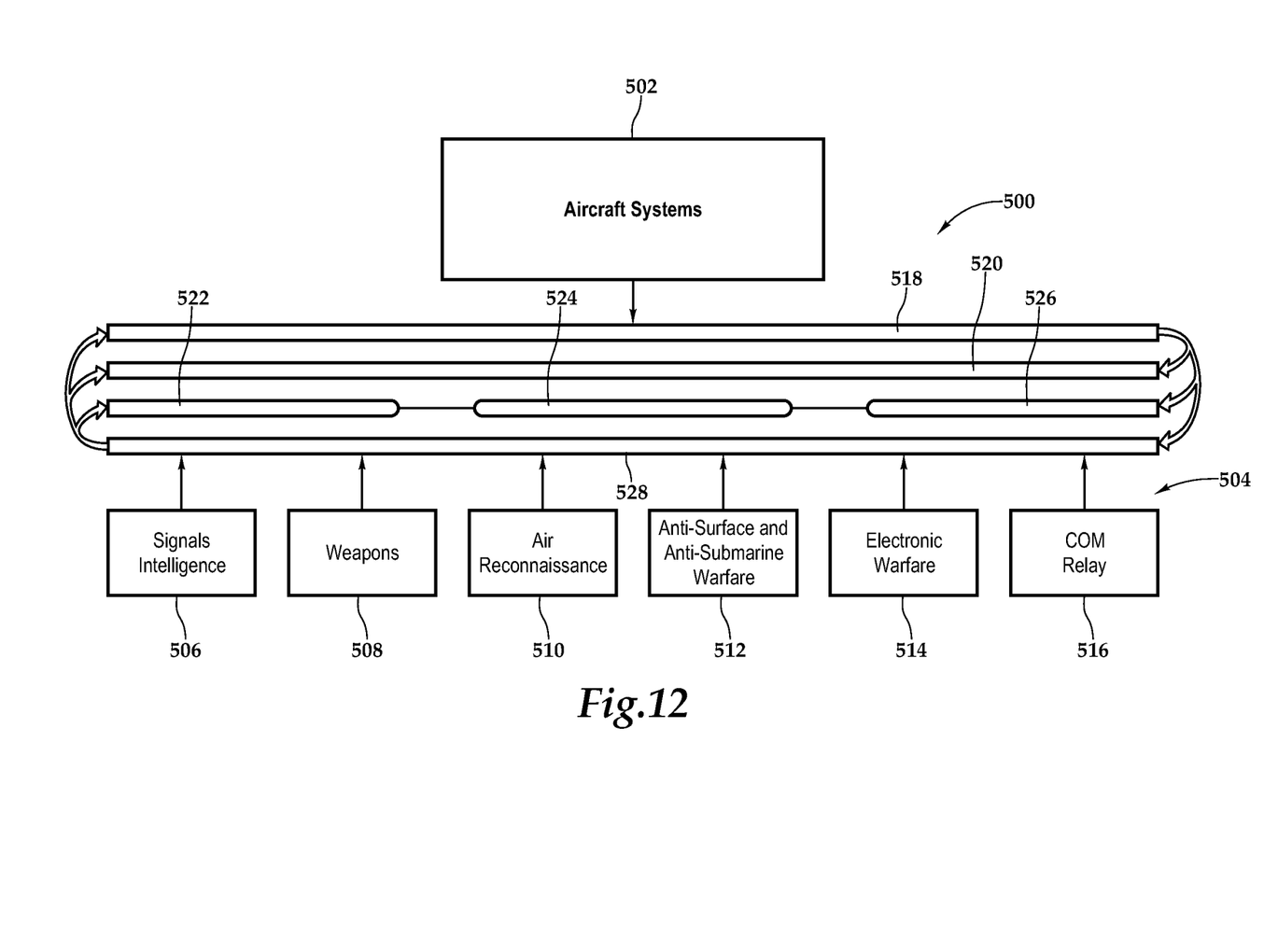
FIG. 12 is a diagram illustrating a system architecture of an aircraft with a modular payload system in accordance with embodiments of the present disclosure.

Referring to FIG. 12, the system architecture for an aircraft is schematically illustrated and generally designated 500. System architecture 500 includes aircraft systems 502, including, but not limited to, a COM suite, NAV guidance, payload management, a self-protection suite, autonomous flight controls, tactical data links, mission management, an electro-optical targeting system, aircraft subsystems and/or any combination thereof. System architecture 500 also includes modular payload system 504, including several categories of payload modules that are interchangeably insertable into the aircraft. Modular payload system 504 may include signals intelligence modules 506, such as a Twister module. Modular payload system 504 may also include weapons modules 508, such as AGM 114 HF/JAGM, GBU-39 SDB, GBU-12 PAVEWAY, GBU-38 JDAM, APKWS, directed energy or common launch tube modules. Modular payload system 504 may also include air reconnaissance modules 510, such as an AN/ZPY-1 module. Modular payload system 504 may also include anti-surface and/or anti-submarine warfare modules 512, such as AN/AES-1, AN/AQS-22 ALF S, AGM-119, MK 46, MK 50, MK 54 or sonobuoy modules. Modular payload system 504 may also include electronic warfare or attack modules 514, such as NGAEA JAMMER, HARM, AMRAAM, ALQ-231 INTREPID TIGER or AIM-9X modules. Modular payload system 504 may also include COM relay modules 516, which may include communications modules. Any combination of payload module categories 506, 508, 510, 512, 514, 516 may be used on an aircraft. In addition, non-illustrated payload module categories may be included on the aircraft, such as cargo hooks, automatic landing systems, fuel and persistent MSN modules.

System architecture 500 also includes a number of buses to facilitate communication between payload modules 506, 508, 510, 512, 514, 516 and aircraft systems 502. In particular, system architecture 500 includes a flight bus 518, a mission bus 520, a weapons bus 522, a power bus 524, a survivability bus 526 and a modular mission payload bus 528. Buses 518, 520, 522, 524, 526, 528 enable communication between aircraft systems 502 and payload modules 506, 508, 510, 512, 514, 516, and utilize the modular bay interfaces and payload interfaces described above. Non-military or commercial payload modules are also encompassed by the illustrative embodiments. For example, an aircraft using the modular payload system may be able to utilize a wireless Internet module or a package delivery module with multiple doors that may be actuated independently to deliver a particular package therein.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Unless otherwise indicated, as used herein, "or" does not require mutual exclusivity. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A modular payload system for an aircraft having a fuselage, the system comprising:
   a first modular bay recessed within the underside of the fuselage, the first modular bay including a first modular bay interface having a first plurality of connectors;
   a second modular bay recessed within the underside of the fuselage, the second modular bay including a second modular bay interface having a second plurality of connectors;
   a first plurality of payload modules each having a respective function and a first payload interface including one or more payload connectors adapted to connect to at least a portion of the first connectors; and
   a second plurality of payload modules each having a respective function and a second payload interface including one or more payload connectors adapted to connect to at least a portion of the second connectors;
   wherein, the first modular bay is a central modular bay disposed along a longitudinal centerline of the aircraft and flanked by the second modular bay;
   wherein, the number of first connectors is greater than the number of payload connectors of the first payload interface;
   wherein, the first plurality of payload modules are interchangeably insertable into the first modular bay to enable the first modular bay to support the functions of the first plurality of payload modules;
   wherein, the second plurality of payload modules are interchangeably insertable into the second modular bay to enable the second modular bay to support the functions of the second plurality of payload modules; and
   wherein, the first payload interface of a payload module in the first plurality of payload modules connects to at least a portion of the first modular bay interface in response to the payload module being inserted into the first modular bay.

2. The modular payload system as recited in claim 1 wherein, the first payload interface is adapted to connect to at least a portion of the first modular bay interface to provide at least one of electrical communication, hydraulic communication, data communication and fluid communication between the aircraft and the respective payload module.

3. The modular payload system as recited in claim 1 wherein, the first modular bay interface further comprises at least one of a power connector, a ground connector, an imagery connector, a data bus connector, a cooling connector and a fuel line connector.

4. The modular payload system as recited in claim 1 wherein, at least one of the first plurality of payload modules is selected from the group consisting of a fuel module, a weapons module, a communications module, an air reconnaissance module, an anti-surface warfare module, an anti-submarine warfare module, an electronics warfare module and a signals intelligence module.

5. The modular payload system as recited in claim 4 wherein the fuel module further comprises one of a fuel tank or a fuel bag internalized in the fuselage of the aircraft when the fuel module is inserted in the first modular bay.

6. The modular payload system as recited in claim 1 wherein, the first plurality of payload modules further comprises a payload module having a bay door.

7. The modular payload system as recited in claim 6 wherein, the payload module forms an interior cavity adapted to carry a payload and wherein, the bay door is adapted to open in response to a command from the aircraft to expose the payload.

8. The modular payload system as recited in claim 7 wherein, the payload further comprises one or more missiles operably mounted to the bay door.

9. The modular payload system as recited in claim 1 wherein the first modular bay further comprises at least one wall including the first modular bay interface; and
    wherein the first connectors of the first modular bay interface are substantially flush with the at least one wall.

10. The modular payload system as recited in claim 1 wherein the first modular bay further comprises at least one wall including the first modular bay interface; and
    wherein the first connectors of the first modular bay interface protrude from the at least one wall.

11. The modular payload system as recited in claim 1 wherein, the first modular bay further comprises one or more tracks adapted to guide the first payload modules into the first modular bay and wherein, the first plurality of payload modules each comprises one or more grooves adapted to slidably engage with the one or more tracks.

12. The modular payload system as recited in claim 11 wherein the tracks and grooves are operable to guide the first payload modules into the first modular bay such that the first payload interface and the first modular bay interface connect to form a communication link in response to one of the first payload modules being inserted into the first modular bay.

13. The modular payload system as recited in claim 1 wherein the first modular bay interface and the first payload interface further comprise a quick disconnect junction including a bay receptacle in the first modular bay and a payload module receptacle on each first payload module, the bay receptacle adapted to connect to the payload module receptacle in response to one of the first payload modules being inserted into the first modular bay.

14. The modular payload system as recited in claim 1 wherein the first payload interface of the payload module connects to at least a portion of the first modular bay interface in response to the payload module being pushed into the first modular bay.

15. The modular payload system as recited in claim 1 wherein the aircraft further comprises a tiltrotor aircraft.

16. The modular payload system as recited in claim 1 wherein the central modular bay is longer than the second modular bay.

17. The modular payload system as recited in claim 1 further comprising:
    a third modular bay recessed within the underside of the fuselage and flanking the central modular bay opposite the second modular bay.

18. An aircraft comprising:
    a fuselage having an underside;
    a first modular bay recessed within the underside of the fuselage, the first modular bay including a modular bay interface having a plurality of connectors;
    a second modular bay recessed within the underside of the fuselage, the second modular bay including a modular bay interface;
    one of a first plurality of payload modules inserted into the first modular bay, the first plurality of payload modules each having a respective function and a first payload interface including one or more payload connectors adapted to connect to at least a portion of the connectors of the modular bay interface of the first modular bay; and
    one of a second plurality of payload modules inserted into the second modular bay, the second plurality of payload modules each having a respective function and a payload interface adapted to connect to at least a portion of the modular bay interface of the second modular bay;
    wherein, the first modular bay is a central modular bay disposed along a longitudinal centerline of the fuselage and flanked by the second modular bay;
    wherein, the number of connectors of the modular bay interface of the first modular bay is greater than the number of payload connectors of the first payload interface;
    wherein, the first plurality of payload modules are interchangeably insertable into the first modular bay to enable the first modular bay to support the functions of the first plurality of payload modules;
    wherein, the second plurality of payload modules are interchangeably insertable into the second modular bay to enable the second modular bay to support the functions of the second plurality of payload modules; and
    wherein, the first payload interface of a first payload module of the first plurality of payload modules is connectable to at least a portion of the modular bay interface of the first modular bay in response to the first payload module being inserted into the first modular bay.

19. The aircraft as recited in claim 18 wherein the first modular bay and the first plurality of payload modules are sized differently than the second modular bay and the second plurality of payload modules.

20. The aircraft as recited in claim 18 wherein the first and second plurality of payload modules are selected from the group consisting of fuel modules, weapons modules, communications modules, air reconnaissance modules, anti-surface warfare modules, anti-submarine warfare modules, electronics warfare modules and signals intelligence modules.

\* \* \* \* \*